3,074,943
SUBSTITUTED TRIAZINES AND PROCESS
FOR THEIR PREPARATION
Piernicola Giraldi, Domenico Artini, and Willy Logemann, Milan, Italy, assignors to Carlo Erba S.p.A., Milan, Italy, a firm
No Drawing. Filed Mar. 21, 1961, Ser. No. 97,175
Claims priority, application Italy Mar. 24, 1960
3 Claims. (Cl. 260—247.2)

This invention relates to the preparation of substituted triazines of the general formula:

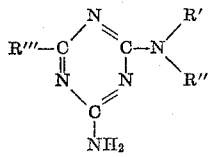

where:
$R'$=hydrogen, alkyl, aryl, alkyl-aryl group, and
$R''$=alkyl, aryl, alkyl-aryl group,
$R'$ and $R''$ may be a part of a heterocyclic ring;
$R'''$ can be either hydrogen or halogen and the $NH_2$ group can be free, acylated, alkylated, arylated, alkyl-arylated or be a part of a heterocyclic ring.

These compounds can be prepared either starting from the corresponding biguanidine derivative and by successive cyclization with acids, acid chlorides, esters and amides, or starting from cyanuric chloride by reaction with 1 mole of alkaline phenate and then with 1 mole of amine, reduction or not of the residual halogen and exchange of phenol with another amine or ammonia; or by reaction of the cyanuric chloride with 2 moles of amine and successive reduction or not of the residual halogen.

These compounds can be prepared starting from suitable thio-alkyl-amino-triazines by reaction with the required amines. These compounds have been tested for antiviral activity in Lee and Craw influenza strains, B types in albino mice. Among the synthesized products are particularly effective those where $R'$ is other than hydrogen, e.g. 2-[N-phenethyl-N-ethyl]-amino-4-s-triazine, 2-[N-N-dibenzyl]-amino-4-amino-s-triazine and 2-morpholinyl-4-amino-s-triazine.

The activity remains even in alkyl- or acyl-4-amino derivatives, e.g. 2-morpholinyl-4-methylamino-s-triazine and 2-morpholinyl-4-acetylamino-s-triazine, eventually even if a halogen is present in 6th position.

Some compounds of these defend HeLa cells against damages caused by viral infection, such as e.g. 2-[N-N-dibenzyl]-amino-4-amino-s-triazine. Introduction of substituents into the benzene ring, such as Cl, $NO_2$, $NH_2$, $SO_2NH_2$ into 2-[N-N-dibenzyl]-amino-4-amino-s-triazine, leads to disappearance of activity. Introduction however of a nitro-group into other products e.g. into the benzene ring of 2-[N-benzyl-N-phenyl]-amino-4-amino-s-triazine does not lead to disappearance of activity.

Other very effective products are those where $R''$=hydrogen, e.g. 2-[N-phenethyl]-amino-4-amino-s-triazine. Acetylation of the $NH_2$ group e.g. in 2-[N-phenethyl]-amino-4-acetylamino-s-triazine involves diminished toxicity.

Many other products of these series corresponding to the general formula have been synthesized and found effective, among which the mentioned products have been chosen as examples.

Following examples illustrate but do not limit this invention:

Example 1

1 mole morpholino-biguanidine hydrochloride, 0.9 mole sodium formate and 5 moles of formic acid are refluxed for 6 h. Formic acid excess is distilled in vacuum, the residue diluted with water, alkalized with ammonia, filtered and crystallized from water, resulting in 2-morpholinyl-4-amino-s-triazine (M.P.=217–218° C.).

Example 2

18.5 g. cyanuric chloride are dissolved in chloroform, added with a solution of 10.4 g. phenol and 4.5 g. sodium hydroxide in 50 cc., constantly stirred, heated to about 50° C. for further 1 h. after addition has been made. The chloroform layer is separated, washed with diluted and cold soda, dried and distilled; phenoxy-dichloro-triazine distills in vacuum at 10 mm., 170° C.

A solution of 0.1 mole phenoxy-dichloro-triazine in 180 cc. chloroform is treated under constant stirring and cooling drop by drop with a solution of 0.1 mole morpholine in 20 cc. chloroform, then with a solution of 0.1 mole $K_2CO_3$ in 20 cc. water and constantly stirred for some length of time; the solution is then separated from chloroform, dried and evaporated. The residue, dissolved in a little chloroform, is precipitated by petroleum ether addition, resulting in phenoxy-morpholino-chloro-triazine (M.P. 108–109° C.).

Phenoxy-morpholino-chloro-triazine is reduced in dioxane with palladium on carbon and calcium oxide at 45–55° C., resulting in phenoxy-morpholino-triazine (M.P.=75–76° C.).

Phenoxy-morpholino-triazine is suspended in an aqueous ammonia solution and heated to 50° C. for many hours, resulting in 2-morpholinyl-4-amino-s-triazine (M.P. 217–218° C.).

Example 3

0.1 mole cyanuric chloride is added with 500 g. ground ice; the resulting suspension is then added at a time with 0.4 mole morpholine and stirred. The mixture thickens immediately, is brought under constant stirring up to about 25° C., then allowed to stay for some hours at room temperature. 2,4-dimorpholinyl-6-chloro-s-triazine is filtered and crystallized from ethanol (M.P. 172–174° C.).

2,4-dimorpholinyl-6-chloro-s-triazine is dissolved in benzene and reduced with palladium on carbon and calcium oxide at 35–45° C. After filtration and solvent evaporation 2,4-dimorpholinyl-s-triazine is obtained by crystallization from ligroin (M.P. 161–162° C.).

Example 4

0.1 mole 2-amino-4-methyl-mercapto-s-triazine is heated with 0.1 mole morpholine to complete removal of methyl-mercaptan, then added with water. The residue is filtered and successively crystallized from water, resulting in 2-morpholinyl-4-amino-s-triazine (M.P. 217–218° C.).

Example 5

2-[N-phenethyl]-amino-4-amino-s-triazine is dissolved in toluene and treated in slight acetic anhydride excess for 2–3 h., then cooled, filtered and crystallized from dioxane, resulting in 2-[N-phenethyl]-amino-4-acetylamino-s-triazine (M.P. 198° C.). Likewise, the process is restorted to with other anhydrides such as propionic, succinic anhydride etc.

The aforementioned processes can be adopted for obtaining the following products too:

(a) 2-[N-N-dibenzyl]-amino-4-amino-s-triazine, M.P. 115–116° C.
(b) 2-[N-benzyl-N-phenyl]-amino-4-amino-s-triazine, M.P. 185–186° C.
(c) 2-[N-phenethyl-N-ethyl]-amino-4-amino-s-triazine, M.P. 169–170° C.

(d) 2-[N-phenethyl-N-benzyl]-amino-4-amino-s-triazine.HCl, M.P. 159–161° C.
(e) 2-[N-diphenyl-N-ethyl]-amino-4-amino-s-triazine, M.P. 105–106° C.
(f) 2-[N-phenethyl-N-phenyl]-amino-4-amino-s-triazine, M.P. 158–160° C.
(g) 2-morpholinyl-4-acetylamino-s-triazine, M.P. 222–223° C.
(h) 2-morpholinyl-4-methylamino-s-triazine, M.P. 164–166° C.
(i) 2-[N-p-nitrobenzyl-N-phenyl]-amino-4-amino-s-triazine, M.P. 208–210° C.
(k) 2-[N-phenethyl-amino-4-phenethyl]-amino-6-chloro-s-triazine, M.P. 250–251° C.
(l) 2-morpholinyl-4-amino-s-triazine, M.P. 220–221° C., and others.

We claim:
1. 2-[N-diphenyl-N-ethyl]-amino-s-triazine, M.P. 105–106° C.
2. 2-morpholinyl-4-acetylamino-s-triazine, M.P. 222–223° C.
3. 2-[N-p-nitrobenzyl-N-phenyl] - amino - 4 - amino-s-triazine, M.P. 208–210° C.

References Cited in the file of this patent

UNITED STATES PATENTS

| 2,320,882 | Oldham | June 1, 1943 |
| 2,658,894 | Kaiser et al. | Nov. 10, 1953 |
| 2,891,855 | Gysin et al. | June 23, 1955 |

FOREIGN PATENTS

| 261,828 | Switzerland | Sept. 1, 1949 |
| 559,000 | Canada | June 17, 1958 |

OTHER REFERENCES

Shapiro et al.: "Journal of the American Chemical Society," volume 79, 1957, pages 5065–5067.

Smolin et al.: "S-Triazines and Derivatives," Interscience Publishers, Inc., New York, 1959, pages 55, 72, 218, 227–229, 233, 235, 298 and 301.